UNITED STATES PATENT OFFICE.

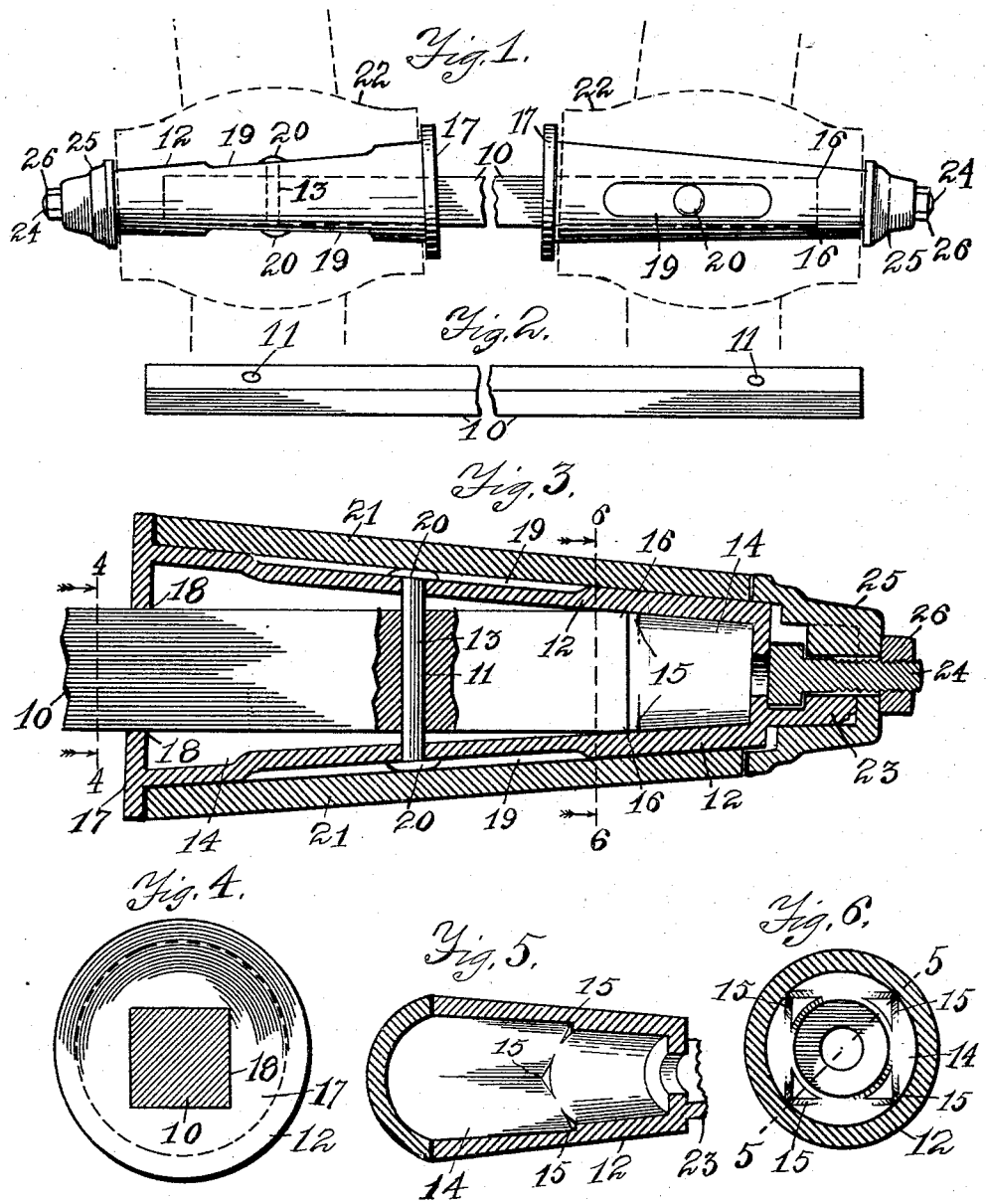

JOHN HERBY AND FREDERICK CHARLES HERBY, OF JAMESTOWN, NEW YORK.

WAGON-AXLE.

1,205,535.  Specification of Letters Patent.  Patented Nov. 21, 1916.

Application filed March 3, 1916.  Serial No. 81,836.

*To all whom it may concern:*

Be it known that we, JOHN HERBY and FREDERICK CHARLES HERBY, citizens of the United States, residing at the city of Jamestown, in the county of Chautauqua and State of New York, have invented certain new and useful Improvements in Wagon-Axles, of which the following, taken in connection with the accompanying drawings, is a specification.

The invention relates to axles for wagons and similar vehicles; and the object is to provide a simple, strong and easily assembled metal bar axle construction with skeins attached thereon, which skeins may be made from cast metal and the metal bar may be cut from the steel bar and the skein may be attached to the steel axle bar without heating or shaping or expensive machine work on said axle bar; and the invention consists in the novel features and combinations hereinafter set forth and claimed.

In the drawings, Figure 1 is an elevation of a wagon axle with the central portion of the axle bar broken away and showing a thimble-skein attached on each end of the straight square axle bar, the hubs of the wheels being shown in dotted lines showing the off-set of said skeins on said straight axle bar at the proper camber. Fig. 2 is an elevation of the straight axle bar, the central portion being broken away. Fig. 3 is a lengthwise sectional view of the thimble-skein attached on the end of the axle bar; also of the box for the wheel hub and the cap for holding said wheel hub on the skein, showing said axle bar inserted and attached at an off-set angle within said skein. Fig. 4 is an end elevation of the inner end of the thimble-skein, the axle bar being shown in section at line 4—4 in Fig. 3. Fig. 5 is a lengthwise sectional perspective of the outer end of the thimble-skein at line 5—5 in Fig. 6, showing how the corners of the end of the axle bar are firmly held within gradually diminishing corner grooves within the skein to thereby insure a fit for said axle end and the firm holding of the same without machining or fitting either part. Fig. 6 is a sectional view of the skein at line 6—6 in Fig. 5 looking toward the outer end and showing the gradually diminishing angular corners in the inner walls of the thimble-skein to receive the square corners of the end of the axle bar.

Like numerals of reference refer to corresponding parts in the several views.

The numeral 10 designates the axle which is cut from the straight square steel bar the desired length without shaping, heating or machining with the exception of drilling the holes 11 therethrough a spaced distance from each end for the attachment of the thimble-skein 12 by means of the rivet 13.

The thimble-skeins 12 are cast hollow with the opening 14 therein which gradually tapers toward the outer end and has the angular corner grooves 15 therein which are formed at a gradual taper to receive and fit the square cut corners 16 of the axle bar 10 therein without shaping to firmly hold said end of the axle bar within said corner grooves 15.

The skein 12 and the axle bar 10 are so attached to one another that said axle bar 10 extends nearly to the outer end of the skein 12 within the same, the corner grooves 15 with the inclined or tapered sides being cast at the point desired for stopping the end of the angle bar 10. The size of the steel bars as drawn in the mill varies slightly. It is essential to the firm holding of the skein 12 upon the end of the angle bar 10 that it should fit firmly onto the same. Accordingly the corner grooves 15 with the inclined sides are provided within the skein 12 so that the end of the axle bar 10 may be pressed into said grooves 15 until it wedges at which point it will make a firm fit. This is particularly true when the skein 12 is heated and shrunk onto the end of the axle bar 10 as is preferred.

The rear end 17 of the thimble 12 is provided with a square hole 18 to fit the axle bar 10. On account of the slight variance in the size of the steel bars 10 as they come from the mill the hole 18 is made sufficiently large to take in the largest bars of the size desired so that when the skein 12 is heated and shrunk onto the bar the walls of the opening 18 will close firmly onto said bar 10 as well as the corner grooves 15 onto the corners 16 of the bar 10 so that said axle bar 10 is firmly held at the corners 16 in the grooves 15 and also in the opening 18. The opening 18 is formed slightly to one side of the center of the skein so as to give the proper camber to the skein 12 on the straight axle bar 10. The hole 11 in the axle bar 10 is not drilled until after the skein 12 is shrunk onto the same; the hole is then drilled through the skein and axle bar and the rivet 13 is inserted.

It is apparent that the heated skein 12 can be slipped onto the end of the axle bar 10 until it wedges in the corner grooves 15 without shaping or changing either of the parts and as the skein cools it shrinks onto the bar thereby holding it firmly in place usually without danger of working loose, the rivet being only used as a preventative against accidental working loose of the skein on the axle bar.

The opposite sides of the skein 12 are cast with the flattened lengthwise recesses 19 which perform the double office of grease cups or recesses for lubricants and to provide recesses for the heads 20 of the rivet 13 without reaming said hole and the consequent weakening so that said rivet 13 can be quickly and easily headed within the recesses 19 with a strong flat head which does not interfere with the box 21 of the wheel hub 22 yet preserves the full thickness and strength of the metal around the hole 11.

The outer end of the skeins 12 are each provided with the projecting socket 23 within which the head of the bolt 24 holds in attaching the cap 25 which holds the wheel hub 22 in place, a suitable nut 26 being provided for the bolt 24.

It is obvious that if the skein 12 is a tight fit on the axle bar 10 at the opening 18 in the inner end then said skein 12 may be driven cold onto the end of the bar until it wedges tightly and firmly in the corner grooves 15, after which the hole 11 is drilled through the skein 12 and bar 10 in the grease cup recesses 19 and the rivet 13 is inserted and headed thereby securely attaching the skein 12 to the bar 10 without heating and shrinking said skein onto said bar. The main essential is to have a tight fit in the opening 18 of the closed end 17 of the skein and also in the grooves 15 thereby giving the parts a double bearing, and it is immaterial whether this tight fit is attained by shrinking the thimble onto the bar or by driving the thimble on the bar cold so that said close fit is attained without machining.

We claim as new:—

1. The combination of a square bar axle cut from the drawn bar without machining, a hollow cast thimble-skein having a hole in its larger end shaped to fit said bar axle, corner grooves in the inner walls of said hollow thimble-skein which wedgingly fit the end of said bar axle, and a rivet through said thimble-skein and bar axle to attach said parts.

2. The combination of a bar axle having the same contour throughout its length, a thimble-skein having a hole in its larger end to fit said axle bar, said hole in said thimble skein extending lengthwise a portion of the way therethrough and slightly diminishing in size toward the end to wedgingly fit the end of said axle bar, said thimble-skein driven onto the end of said axle bar, and a rivet through said thimble-skein and axle bar to securely attach said parts.

3. The combination of a square axle cut from the drawn bar without machining, a cast thimble-skein having a lengthwise off-set opening therein to receive and fit onto the end of said axle bar at the proper camber, said thimble-skein having recesses in the outer opposite sides thereof to form grease cups, and a rivet through said thimble-skein and axle bar headed in said recesses to attach said thimble skein to said axle.

In testimony whereof we have affixed our signatures in the presence of two witnesses.

his
JOHN X HERBY.
mark
FREDERICK CHARLES HERBY.

Witnesses:
H. A. SANDBERG,
C. O. HULTGREN.

Copies of this patent may be obtained for five cents each, by addressing the "Commissioner of Patents, Washington, D. C."